US010257029B2

(12) United States Patent
Strasser

(10) Patent No.: US 10,257,029 B2
(45) Date of Patent: Apr. 9, 2019

(54) METHOD AND ELECTRONICS FOR SETTING UP A LOCAL BROADBAND NETWORK

(71) Applicant: Radioled Holding AG, Wartberg im Muerztal (AT)

(72) Inventor: Andreas Strasser, Koessen (AT)

(73) Assignee: RADIOLED HOLDING AG (AT)

( * ) Notice: Subject to any disclaimer, the term of this patent is extended or adjusted under 35 U.S.C. 154(b) by 224 days.

(21) Appl. No.: 15/109,129

(22) PCT Filed: Sep. 15, 2015

(86) PCT No.: PCT/EP2015/071105
§ 371 (c)(1),
(2) Date: Jun. 30, 2016

(87) PCT Pub. No.: WO2017/008866
PCT Pub. Date: Jan. 19, 2017

(65) Prior Publication Data
US 2017/0149605 A1 May 25, 2017

(30) Foreign Application Priority Data
Jul. 15, 2015 (EP) .................................... 15176855

(51) Int. Cl.
H04W 64/00 (2009.01)
H04W 48/04 (2009.01)
(Continued)

(52) U.S. Cl.
CPC .......... *H04L 41/0803* (2013.01); *H04L 41/12* (2013.01); *H04M 1/72572* (2013.01);
(Continued)

(58) Field of Classification Search
None
See application file for complete search history.

(56) References Cited

U.S. PATENT DOCUMENTS 5,442,804 A 8/1995 Sagers et al.
6,735,395 B1 * 5/2004 Bai ...................... H04B 10/504
372/31
(Continued)

OTHER PUBLICATIONS

ISA/EP, International Search Report and Written Opinion, Int'l Appln No. PCT/EP2015/071105, dated Feb. 1, 2016 (4 pages).
(Continued)

*Primary Examiner* — Charles C Jiang
*Assistant Examiner* — Saad Khawar
(74) *Attorney, Agent, or Firm* — Fish IP Law, LLP

(57) ABSTRACT

A method of setting up a local broadband network contemplates using electronic circuitry to determine a geographic location of the electronic circuitry. The electronic circuitry can measure an actual condition of the local broadband network at the location and select an external function in the local broadband network dependent on the location and the actual condition. The method further contemplates electronic circuitry signaling at least the location and the external function to a central database via a common communication backbone. The electronic circuitry determines whether the local broadband network exceeds a network load threshold value, wherein falling below the network load threshold value causes the electronic circuitry to re-evaluate one or more connections in the local broadband network. The method contemplates that the electronic circuitry complies with a communication protocol of the local broadband network dependent on the external function.

8 Claims, 2 Drawing Sheets

(51) Int. Cl.
*H04W 24/08* (2009.01)
*H04M 1/725* (2006.01)
*H04L 12/24* (2006.01)
*H04W 84/18* (2009.01)
*H04W 88/08* (2009.01)

(52) U.S. Cl.
CPC .......... *H04W 24/08* (2013.01); *H04W 48/04* (2013.01); *H04W 64/003* (2013.01); *H04W 84/18* (2013.01); *H04W 88/08* (2013.01)

(56) References Cited

U.S. PATENT DOCUMENTS

| | | | |
|---|---|---|---|
| 9,430,262 B1* | 8/2016 | Felstaine | G06F 9/45558 |
| 2006/0083181 A1* | 4/2006 | Gebert | H04W 48/16 |
| | | | 370/254 |
| 2007/0010261 A1 | 1/2007 | Dravida et al. | |
| 2008/0076383 A1* | 3/2008 | Barrett | E21F 17/18 |
| | | | 455/404.1 |
| 2011/0039579 A1 | 2/2011 | Karjalainen | |
| 2016/0316377 A1* | 10/2016 | Hooey | H04W 16/18 |

OTHER PUBLICATIONS

Kojima, Fumihide, et al., "Necessary Modifications on Conventional IEEE802.15.3B MAC to achieve IEEE802.15.3C Millimeter Wave WPAN," The 18th Annual IEEE Int'l Symposium on Personal, Indoor and Mobile Radio Communications (PIMRC'07), Sep. 3-7, 2007, 5 pages.

Li, Zexian, et al., "Overview on Initial METIS D2D Concept," 2014 1st Int'l Conference on 5G for Ubiquitous Connectivity (5GU), Nov. 26-28, 2014, 6 pages.

* cited by examiner

METHOD AND ELECTRONICS FOR SETTING UP A LOCAL BROADBAND NETWORK

The present invention relates to a method for setting up a local broadband network. The present invention further relates to corresponding electronics, a corresponding computer program and a corresponding storage medium.

STATE OF THE ART

The so-called mesh network is known in the field of network architecture. Mesh networks according to the prior art are usually self-healing and thus very reliable: When a node or a connection is blocked or fails, the network can reorganize itself around it. The data is rerouted and the network is still operable.

The concept of mesh networks can be applied to both wired and wireless networks as well as to the interaction of programs. Mobile ad hoc networks (MANet), which are supported by many consumer devices, represent a sub-area of mesh networks. A structure is often found in large networks that consists of several different topologies. Thus the Internet is a meshed network to a large extent; nevertheless there are "main arteries" (backbone lines) that are similar to a ring.

DISCLOSURE OF THE INVENTION

The invention provides a method for setting up a local broadband network, corresponding electronics, a corresponding computer program and a corresponding storage medium according to the independent claims. Through the integration of the setting up of the network based on a measurement of the actual conditions by the integrated electronics, they configure themselves as, for example, a repeater, base station, switch, hub, gateway, access point or communication terminal. This information is transmitted to a central database and the appropriate communication protocols made available. This results in a converter for various protocols in the telecommunications sector. The protocols selected by the electronics may cover all mobile radio standards and be provided to various providers.

Further advantageous embodiments according to the invention are specified in the dependent claims. Thus, at least the measurement of the actual conditions and the selection of the external function may take place automatically, i.e. without centralized control or access to external databases. Automatic measurement of the existing ambient frequencies and protocols is integrated in the electronics. The electronics decide independently which frequency bands and protocols should be available in the local network based on the result. Regions with a wireless or wired network can be developed very quickly through this system. Connection to a decentralized network is also made possible through the automatic system.

In one possible embodiment, the electronics operate an antenna controller depending on the external function. By controlling the antenna structure and by using the locations measured by the electronics themselves, limit values may be pre-configured and automatically maintained by the electronics upon setting up the mesh network.

The antenna control preferably takes place by means of a multiplexer fed from a frequency generator via a data modulator. The invention thus provides a new and cost-effective way through which the components integrated in the electronics can automatically set up a network in the range of 400 kHz to 6 GHz, as well as retrofit or update transmission protocols in the above-mentioned frequency ranges at any time through a centralized software packet, thus making an in situ exchange of components unnecessary in the event of a protocol change or new allocation of a frequency range.

Should a region already be developed, in a preferred variant of the invention the electronics automatically switch to acting as a repeater, thereby reducing the radio load which would otherwise be needed in the region.

If a region is still undeveloped for radio, the electronics automatically offer the possibility of forming a multi-provider capable base station in a corresponding configuration that may be seamlessly integrated into the network of the mobile provider. The automatism of the electronics also allows an increased load demand in a developed region to be compensated without the provider having to provide an additional network infrastructure.

The high frequency filter (HF filter) integrated in the electronics for measuring the actual conditions is advantageously a vacuum-sealed filter made of glass and coated internally with metal.

BRIEF DESCRIPTION OF THE DRAWINGS

An exemplary embodiment of the invention is shown in the drawings and is described in more detail below.

EMBODIMENTS OF THE INVENTION

Figure 1:
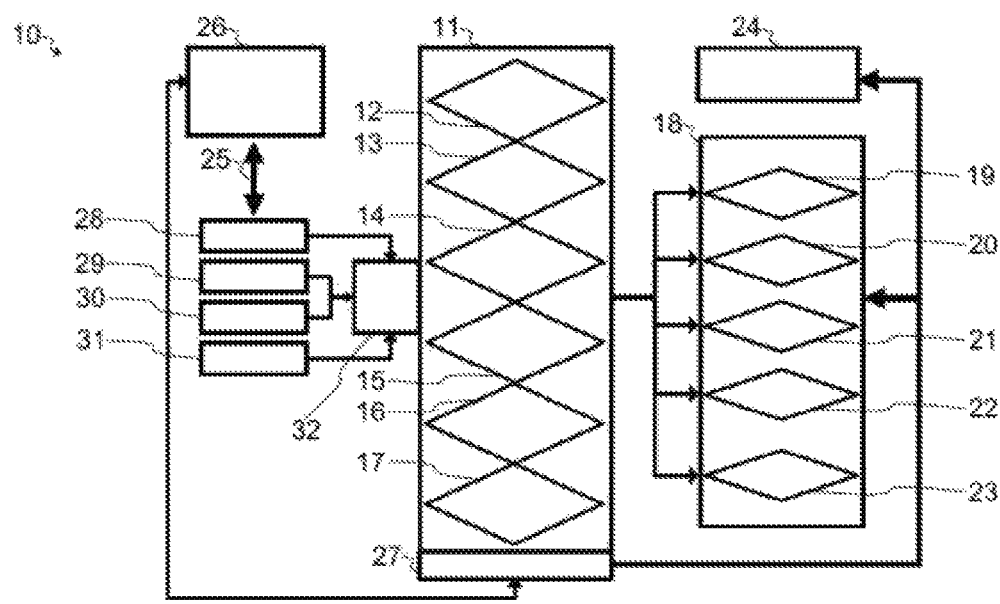
FIG. 1 shows a method according to an embodiment of the invention.

FIG. 1 shows a method (10) for setting up a local broadband network according to the invention. The electronics initially perform a comprehensive analysis and measurement (11) of their location (12) as well as the actual conditions (13-17) present there. The latter is defined through the ambient frequency bands (13) and the respective strength (14) of the signals detected therein, the speed of upload and download (15) as well as the environmental health (16) and, in particular, the local limit values (17) for the permissible radiation load.

The electronics select an external function (18) based on the analysis and measurement (11). Thus the electronics may serve as a base transceiver station (BTS), short base station (19), repeater (20), gateway (21) or access point (22) or fulfill a variety of other functions (23) as a communication terminal depending on the application. Depending on the selected external function (18), there is then continuous antenna control (24) by the electronics, wherein the location (12) may also be used to achieve a beamforming adjusted to the geometric contour of the surroundings.

The electronics further transfer the data (25) resulting from the analysis and measuring (11), according to the internet protocol (IP), to the database of a data center (26), which provides the electronics with configuration updates (27) on this basis.

If the network load of the electronics falls below a certain threshold value, then the electronics can re-evaluate their connections according to an updated set of rules by means of the retrieved configuration updates (27) and store them in the memory as a new network plan.

The transmission of the data (25) as well as the reception of the configuration updates (27) can take place either via Ethernet (28), optical fiber (fiber, 29) as well as using radio (30) or carrier frequency technology (powerline communication, PLC, 31). If a direct IP connection to the data center (26) is not possible, the electronics can at least set up an indirect connection according to the stored network plan via the next multipoint-enabled network node (19-23). To achieve simultaneous transmission of different data via a single antenna structure, they are bundled by a suitable multiplexer (32).

Figure 2:
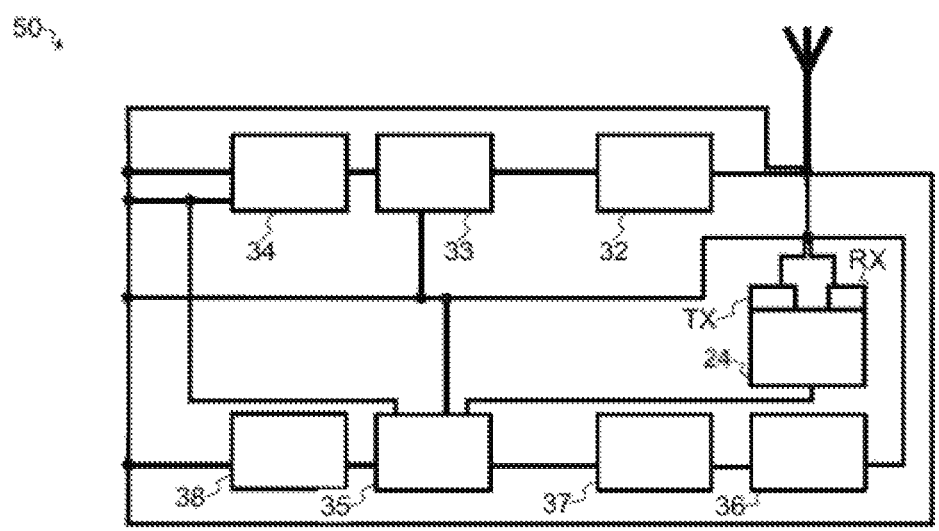
FIG. 2 shows a block diagram with the inputs and outputs of the electronics. Furthermore, the antenna control integrated in the electronics is visible.

FIG. 2 illustrates the above-described operation by means of a schematic overview of the electronic circuitry (50). The multiplexer (32) connected to the transmitter (transmit, TX) and receiver (receive, RX) of the antenna control (24) is recognizably fed with the different base bands from a frequency generator (34) via a data modulator (33), wherein the receiver (TX), data modulator (33) and frequency generator (34) are controlled via a central processing unit (CPU, 35) of the electronic circuitry (50).

The input signals received through the receiver (RX) are in turn supplied via a high frequency filter (36) to a signal processor (37). The demodulated useful and configuration data can thus be further processed by the central processing unit (35). The latter may, in case of an appropriate design, be simultaneously used, for example, for lighting control (38), so that the electronic circuitry (50) are integrated as part of a lighting system in municipal infrastructure.

Figure 3:
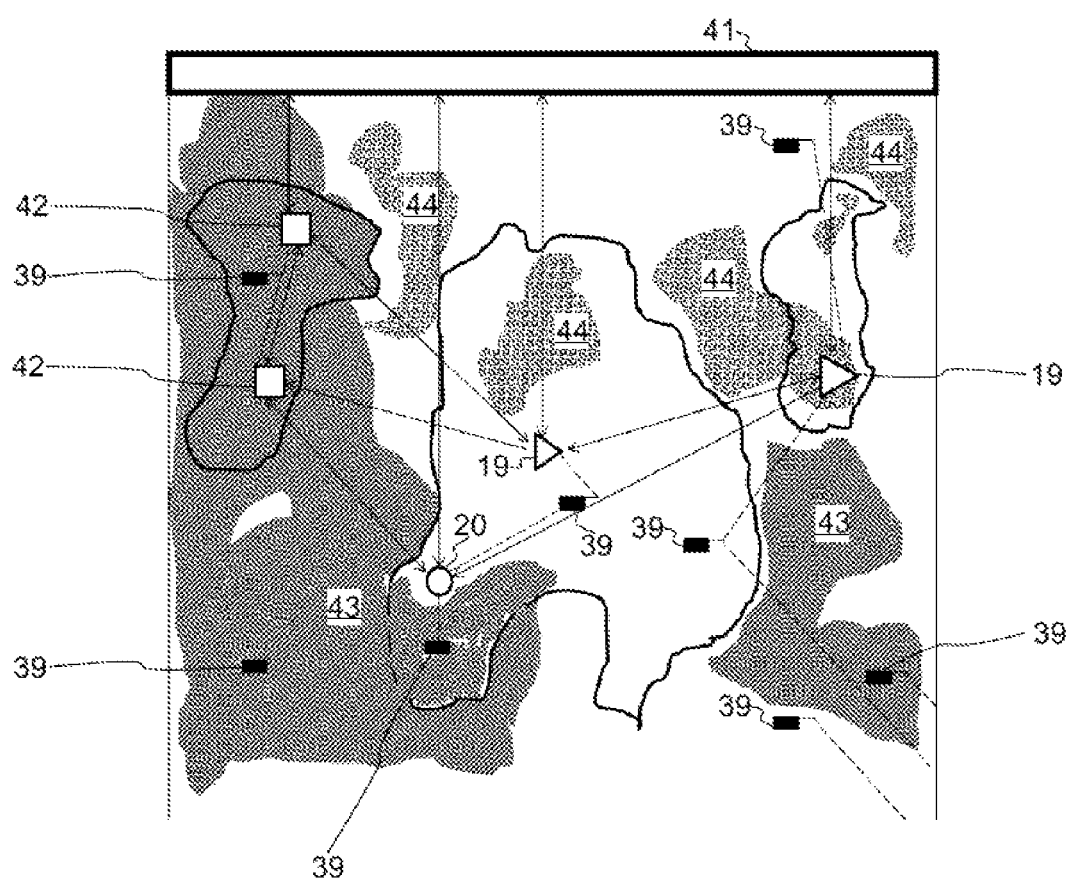
FIG. 3 shows an area of developed and undeveloped regions and shows three functional possibilities for the electronics (base station, repeater, communication device) for different regions. Furthermore, some connection options are presented in FIG. 3 with the different functionalities of the electronics according to the invention

FIG. 3 highlights this use case by means of a simple topology. According to the figure, the network nodes (19, 20, 42) serving as required as a base station (19), repeater (20) or communication terminal (42), along with their mutual connections, form a local mesh network that connects a plurality of mobile terminals (39) with a common communications backbone (41).

Depending on the actual measured condition (13-17, see FIG. 1) the similar electronics (50, see FIG. 2) inherent to each network node (19, 20, 42) assign the previously determined location (12, see FIG. 1) to a region (43) developed for the broadband network or a region (44) undeveloped for the broadband network. The electronic circuitry (50) then again serve as the base station (19), a repeater (20) or communication terminal (42) depending on the assignment to one of the regions (43, 44).

The invention claimed is:

1. A method for setting up a local broadband network, comprising:
   determining, by electronic circuitry, a geographic location of the electronic circuitry;
   measuring, by the electronic circuitry, an actual condition of the local broadband network at the location;
   selecting, by the electronic circuitry, an external function in the local broadband network dependent on the location and the actual condition;
   signaling, by the electronic circuitry at least the location and the external function to a central database via a common communication backbone;
   determining, by the electronic circuitry, whether the local broadband network exceeds a network load threshold value, wherein falling below the network load threshold value causes the electronic circuitry to re-evaluate one or more connections in the local broadband network;
   assigning, by the electronic circuitry, the geographic location to one of a first region or a second region based on the actual condition; and
   selecting, by the electronic circuitry, a first function as the external function based on the assignment of the geographic location to the first region or a second function as the external function based on the assignment of the geographic region to the second region;
   wherein the electronic circuitry complies with a communication protocol of the local broadband network dependent on the external function.

2. The method according to claim 1, wherein:
the measuring of the actual condition and the selection of the external function is effected automatically.

3. The method according to claim 1, further comprising:
operating, by the electronic circuitry, an antenna control depending on the external function.

4. The method according to claim 3, wherein:
the antenna control is effected by a multiplexer fed from a frequency generator via a data modulator.

5. The method according to claim 1, wherein:
depending on the selected external function, the electronic circuitry operates as:
   a repeater;
   a multi-provider capable base station;
   a switch;
   a hub;
   a gateway;
   an access point; or
   a communication terminal.

6. Electronic circuitry for setting up a broadband network, comprising:
   electronics circuitry configured to determine a geographic location of the electronic circuitry;
   a high frequency filter for measuring an actual condition of the broadband network at the location;
   a first set of integrated electronics for selecting an external function in the broadband network depending on the location and the actual condition;
   a transmitter for reporting at least the location and the external function to a central database via a common communication backbone;
   a computer processor for determining whether the local broadband network exceeds a network load threshold value, wherein falling below the network load threshold value causes the electronic circuitry to re-evaluate one or more connections in the local broadband network; and
   a second set of integrated electronics for complying with a communication protocol of the broadband network dependent on the external function;
   wherein the electronics circuitry is further configured to:
      assign the geographic location to one of a first region or a second region based on the actual condition; and
      select a first function as the external function based on the assignment of the geographic location to the first region or a second function as the external function based on the assignment of the geographic region to the second region.

7. A non-transitory machine-readable storage medium having a computer program stored thereon that, when executed by a processor, causes the processor to execute the steps of:

determining a geographic location;

measuring an actual condition of a local broadband network at the location;

selecting an external function in the local broadband network dependent on the location and the actual condition;

signaling at least the location and the external function to a central database via a common communication backbone;

determining whether the local broadband network exceeds a network load threshold value, wherein falling below the network load threshold value causes the electronic circuitry to re-evaluate one or more connections in the local broadband network;

assigning the geographic location to one of a first region or a second region based on the actual condition; and selecting a first function as the external function based on the assignment of the geographic location to the first region or a second function as the external function based on the assignment of the geographic region to the second region; and complying with a communication protocol of the local broadband network dependent on the external function.

8. The method of claim 1, wherein the actual condition is determined based at least in part on the local limit values for permissible radiation load.

* * * * *